(12) United States Patent
Pandi et al.

(10) Patent No.: US 9,780,606 B2
(45) Date of Patent: Oct. 3, 2017

(54) MULTI MATERIAL ROTOR CORE

(71) Applicant: GM Global Technology Operations LLC, Detroit, MI (US)

(72) Inventors: Murali Pandi, Madurai (IN); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 14/624,912

(22) Filed: Feb. 18, 2015

(65) Prior Publication Data
US 2016/0241089 A1    Aug. 18, 2016

(51) Int. Cl.
| | |
|---|---|
| H02K 1/02 | (2006.01) |
| H02K 1/06 | (2006.01) |
| H02K 1/30 | (2006.01) |
| H02K 5/00 | (2006.01) |
| H02K 1/27 | (2006.01) |

(52) U.S. Cl.
CPC ............ *H02K 1/02* (2013.01); *H02K 1/2766* (2013.01)

(58) Field of Classification Search
CPC ................................. H02K 1/27; H02K 21/16

USPC .... 310/216.004, 216.008, 216.016, 216.017, 310/420, 421, 422, 424
See application file for complete search history.

(56) References Cited

U.S. PATENT DOCUMENTS

| | | | |
|---|---|---|---|
| 4,618,792 A * | 10/1986 | Yates | H02K 1/2773 310/156.56 |
| 2008/0296990 A1* | 12/2008 | Evans | H02K 1/276 310/156.56 |
| 2015/0364959 A1* | 12/2015 | Oketani | H02K 1/276 310/156.11 |

FOREIGN PATENT DOCUMENTS

JP    WO 2014128863 A1 *  8/2014  ............. H02K 1/276

* cited by examiner

*Primary Examiner* — Jose Gonzalez Quinones
(74) *Attorney, Agent, or Firm* — BrooksGroup

(57) ABSTRACT

The disclosure may generally relate to a motor which may include a rotor core which may include a first rotor lamination portion and a second rotor lamination portion. At least one magnet may be operably coupled to the first rotor lamination. The first rotor lamination may be in contact with the at least one magnet and the second rotor lamination may not be in contact with the at least one magnet. Additionally, the first rotor lamination and the second rotor lamination may be comprised of different materials.

2 Claims, 1 Drawing Sheet

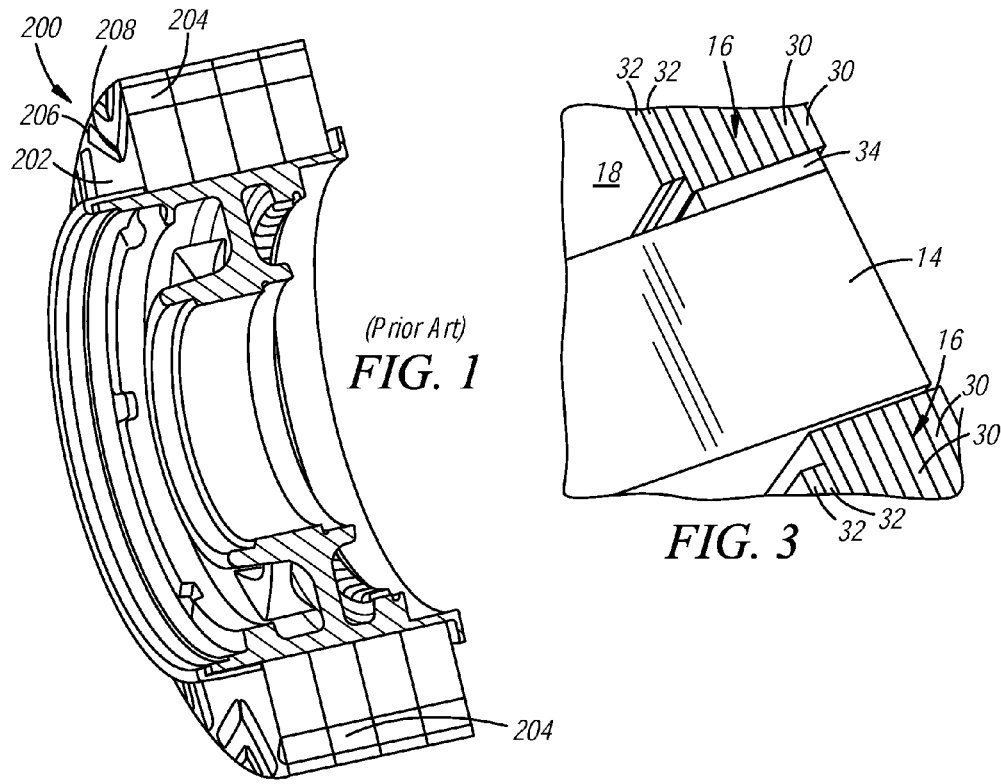
(Prior Art)
FIG. 1
FIG. 3
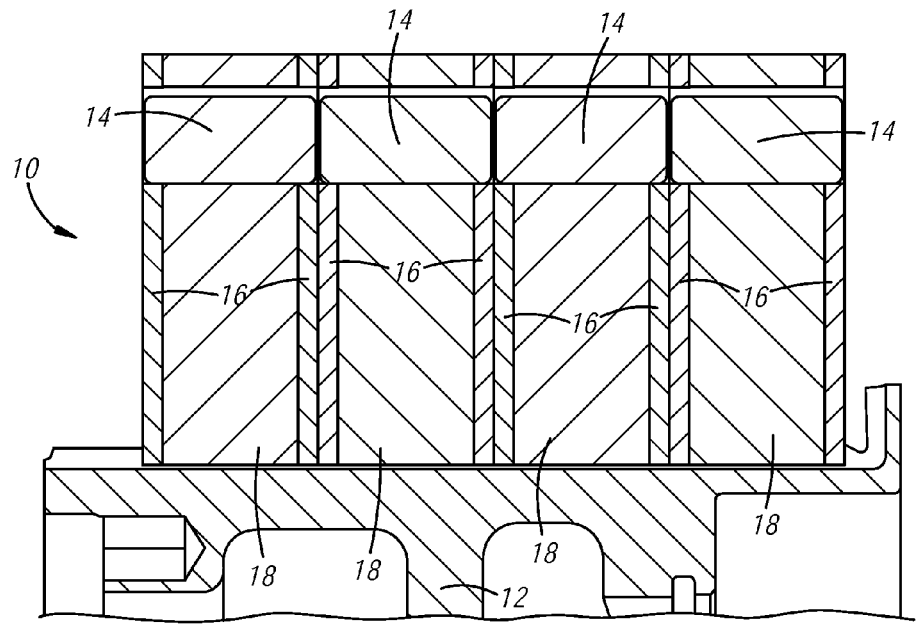
FIG. 2

MULTI MATERIAL ROTOR CORE

TECHNICAL FIELD

The field to which the disclosure generally relates to includes vehicle systems including vehicle motor systems.

BACKGROUND

Vehicle systems may include various vehicle motor systems. A motor may include a rotor lamination.

SUMMARY OF ILLUSTRATIVE VARIATIONS

A number of variations may include a motor which may include a rotor core. The rotor core may include one or several layers of rotor laminations. The rotor core may include a first rotor lamination portion and a second rotor lamination portion. Moreover, the rotor lamination may further include at least one of a bridge or a web. Additionally, at least one magnet may be operably coupled to the rotor lamination. The first rotor lamination portion may be in contact with the at least one magnet and the second rotor lamination portion may not be in contact with the at least one magnet. Moreover, none of the bridge or web support the at least one magnet.

A number of other variations may include a product which may include a rotor lamination. The rotor lamination may include an annular portion which may include an annular opening at its center. Moreover, the rotor lamination may include a plurality of magnets which may be disposed in the annular portion. Additionally, a linear first rotor lamination portion and a linear second rotor lamination portion may be disposed adjacent to the plurality of magnets. The first rotor lamination portion may be in direct contact with the at least one magnet and the second rotor lamination portion may not be in direct contact with the at least one magnet.

Yet a number of other variations may include a traction motor which may include at least one rotor core. At least one magnet may be disposed in the rotor core. Moreover, a first rotor lamination portion and a second rotor lamination portion may be included. The first rotor lamination may be in contact with the at least one magnet and the second rotor lamination portion may not be in contact with the at least one magnet. Moreover, the magnet may be suspended in the second rotor lamination portion.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 shows a prior art motor system;

FIG. 2 shows a portion of a motor system according to a number of variations; and FIG. 3 shows a partial perspective illustration of the motor system according to a number of variations.

DETAILED DESCRIPTION OF ILLUSTRATIVE VARIATIONS

The following description of the variations is merely illustrative in nature and is in no way intended to limit the scope of the invention, its application, or uses.

Referring to FIGS. 2 and 3, a motor system 10 may include a rotor core comprising a first rotor lamination portion and a second rotor lamination portion, wherein the rotor lamination may include at least one of a bridge or a web. At least one magnet may be operably coupled to the rotor lamination. Additionally, the first rotor lamination portion may be in contact with the at least one magnet and the second rotor lamination portion may not be in contact with the at least one magnet. Moreover, none of the bridge or web support the at least one magnet.

FIG. 1 shows a prior art motor vehicle system 200. The prior art motor vehicle system 200 may include a motor rotor lamination 202 along with a magnet 204 or a plurality of magnets. The rotor lamination 202 may include a bridge 206 and a web 208 which may be integral in supporting the magnet 204. With the configuration illustrated in FIG. 1, centrifugal force due to rotor lamination and magnetic mass is resisted at thin features such as the bridge 206 and the web 208. Therefore, the sizing of the bridge 206 and the web 208 becomes very important in terms of rotor life and performance.

Referring now to the variations illustrated in FIGS. 2 and 3, the motor system 10 may further include a hub 12. The hub 12 may be comprised of any material as known by one of ordinary skill in the art including aluminum, steel or other materials which have the required strength to support the motor system 10. Referring now to the variations illustrated in FIGS. 2 and 3, the magnet 14 may be operably coupled to the rotor lamination. The rotor lamination may include an annular portion which may include an aperture at its center. It is contemplated that the aperture may be annular or any other configuration as known by one of ordinary skill in the art. The annular portion of the rotor lamination may include a plurality of cutouts which may extend about a periphery of the annular portion. Moreover, it is contemplated that the magnet 14 may be disposed in one or more of the plurality of cutouts. It is contemplated that the magnet 14 may be a neo magnet, or any other type of magnet as known by one of ordinary skill in the art. Additionally it is contemplated that the magnet 14 may be a permanent magnet as known by one of ordinary skill in the art. Moreover, it is contemplated that the magnet 14 may be a, for example, rare earth N36Z magnet as known by one of ordinary skill in the art. Moreover, additional or other types of magnets may be used in the motor system 10 as known by one of ordinary skill in the art.

The motor system 10 may also include the first rotor lamination portion 16 and the second rotor lamination portion 18. The first rotor lamination portion 16 and the second rotor lamination portion 18 may be operably coupled to the hub 12 and may additionally be operably coupled to the at least one magnet 14. As illustrated in the variation shown in FIGS. 2 and 3, the first rotor lamination portion 16 may be in contact with the at least one magnet 14. It is contemplated that the first rotor lamination portion 16 may surround the at least one magnet 14. It is additionally contemplated that the first rotor lamination portion 16 may be constructed and arranged to suspend the magnet 14 such that the magnet 14 may only be in direct contact with the first rotor lamination portion 16. Suspending the at least one magnet 14 in the first rotor lamination portion 16 allows the first rotor lamination 16 to absorb all of the centrifugal force coming from the magnet 14, which in turn allows the second rotor lamination portion 18 to be free from centrifugal force coming from the magnet 14.

Referring again to the variations illustrated in FIGS. 2 and 3, it is contemplated that the first rotor lamination portion 16 and the second rotor lamination portion 18 may be comprised of one or more laminations. The thickness of the first and second rotor lamination 16, 18 may be approximately 0.1-0.35 mm thickness and more specifically approximately 0.27 mm or less. In one variation, the first rotor lamination portion 16 may be comprised of multiple layers of load carrying high strength electrical steel. It is contemplated that the high strength electrical steel may be 35PNT650Y steel as known by one of ordinary skill in the art. It is also contemplated that the first rotor lamination 16 may be comprised of any other high strength material as known by one of ordinary skill in the art. Additionally it is contemplated that the first rotor lamination may be alternatively comprised of casted or machined aluminum, steel, plastic polymer, or any other material as known by one of ordinary skill in the art.

Moreover, the second rotor lamination portion 18 may be comprised of multiple layers of high electromagnetic performance steel. The second rotor lamination portion 18 may be more specifically comprised of 27JNE1350T high electromagnetic performance steel. It is also contemplated that any other type or form of electromagnetic performance material may be used to form the rotor lamination portion 16 and 18. It is additionally contemplated that the first rotor lamination portion 16 and the second rotor lamination portion 18 may be linear. Moreover, it is contemplated that the first and second lamination portions 16, 18 may be constructed and arranged in another fashion adjacent to the magnet 14.

The variation illustrated in FIG. 3 shows approximately 8 individual strips of load carrying steel which may form the first rotor laminate 16. Moreover, it is contemplated that any number of load carrying strips may be used to form the desired thickness of the first rotor lamination 16 as known by one of ordinary skill in the art. As illustrated in the variation shown in FIG. 2, the second rotor lamination 18 may be comprised of approximately 30 strips of high electromagnetic performance steel. Moreover, it is contemplated that any number of electromagnetic performance material may be used in order to form the second rotor lamination 18. It is contemplated that the first and second rotor lamination 16, 18 may have a thickness of 0.25 mm or less, in order to achieve minimal electromagnetic core losses. It is also contemplated that the at least one magnet 14 may be held at only two or less locations. This allows the centrifugal force produced by the at least one magnet 14 in operation to be exclusively transferred to the two contacting locations and therefore increases life of the rotor lamination by transferring the load only to first rotor lamination portion 16.

Referring again to the variations shown in FIGS. 2 and 3, it is contemplated that the at least one magnet 14 may have a length of approximately 13-14 mm and more specifically approximately 13.8 mm. Moreover, it is contemplated that the first rotor lamination material 30 may be approximately 0.3-0.4 mm thick and more specifically approximately 0.35 mm thick. Additionally, the second rotor lamination material 32 may be approximately 0.2-0.3 mm thick and more specifically approximately 0.27 mm thick.

It is contemplated that the variations illustrated in FIGS. 2 and 3 may provide significant improvement in rotor lamination life and more specifically, compared to prior art 200, can provide up to a 2581% and 48% life improvement observed at the bridge and web respectively. Moreover, the magnet 14 may additionally have an increase performance by keeping the same size of magnet or the at least one magnet may be reduced in order to save cost and volume while keeping the performance the same according to at least one variation of the present invention.

In the variation illustrated in FIG. 3, the motor system 10 may further include an epoxy 34 which may be disposed between the magnet 14 and first rotor laminations 16. It is also contemplated that the epoxy 34 may be eliminated from the system. It is contemplated that this motor system 10 may be included in ferrite magnet rotors however it is also contemplated that this motor system may be included in any type of rotor system.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a motor which may include a rotor lamination. The rotor lamination may include a first lamination portion and a second rotor lamination portion. Moreover, the rotor lamination may include at least one of a bridge or a web. At least one magnet may be operably coupled to the rotor lamination. Moreover, the first rotor lamination portion may be in contact with the at least one magnet and a second rotor lamination portion may not be in contact with the at least one magnet. Additionally, none of the bridge or web support the at least one magnet.

Variation 2 may include the motor as described above in Variation 1 wherein the first rotor lamination portion may be comprised of electrical steel.

Variation 3 may include the motor as set forth in any of Variations 1-2 wherein the at least one magnet may be a permanent magnet.

Variation 4 may include the motor as set forth in any of Variations 1-3 wherein the at least one magnet may be a neo magnet.

Variation 5 may include the motor as set forth in any of Variations 1-4 wherein the second rotor lamination portion may be free from centrifugal force coming from the at least one magnet.

Variation 6 may include the motor as set forth in any of Variations 1-5 wherein the first rotor lamination portion and the second rotor lamination portion may be comprised of different materials.

Variation 7 may include the motor as set forth in any of Variations 1-6 wherein the first rotor lamination portion may be linear.

Variation 8 may include the motor as set forth in any of Variations 1-7 wherein the second rotor lamination portion may be linear.

Variation 9 may include a product which may include a rotor lamination. The rotor lamination may include an annular portion which may include an annular opening at its center. Moreover, a plurality of magnets may be disposed in the annular portion. Moreover, a linear first rotor lamination portion and a linear second rotor lamination portion may be disposed adjacent to the plurality of magnets. The first rotor lamination portion may be in direct contact with the at least one magnet and the second rotor lamination portion may not be in direct contact with the at least one magnet.

Variation 10 may include the product as set forth in Variation 9 wherein the rotor lamination may include one of a bridge or a web.

Variation 11 may include the product as set forth in any of Variations 9-10 wherein the at least one magnet may not be supported by the bridge or the web.

Variation 12 may include the product as set forth in any of Variations 9-11 wherein the wherein the first rotor lamination and the second rotor lamination may be comprised of different materials.

Variation 13 may include the product as set forth in any of Variations 9-12 wherein the first rotor lamination portion may be comprised of a high mechanical strength steel.

Variation 14 may include the product as set forth in any of Variations 9-13 wherein the second rotor lamination portion may be comprised of a high electrical performance material.

Variation 15 may include the product as set forth in any of Variations 9-14 wherein the second rotor lamination portion may be comprised of a high electrical performance steel.

Variation 16 may include a traction motor which may include at least one rotor core and at least one magnet which may be disposed in the rotor core. Moreover, a first rotor lamination portion and a second rotor lamination portion may be provided. The first rotor lamination portion may be in contact with the at least one magnet and the second rotor lamination portion may be in contact with an epoxy and may not be in contact with the at least one magnet.

Variation 17 may include the traction motor as set forth in Variation 16 wherein the rotor core may further include at least one of a bridge or a web.

Variation 18 may include the traction motor as set forth in any of Variations 16 or 17 wherein none of the bridge or the web support the at least one magnet.

Variation 19 may include the traction motor as set forth in any of Variations 16-18 wherein the second rotor lamination portion may be free from centrifugal force coming from the at least one magnet.

Variation 20 may include the traction motor as set forth in any of Variations 16-19 wherein the second rotor lamination may be comprised of a high electromagnetic performance steel.

The above description of select variations within the scope of the invention is merely illustrative in nature and, thus, variations or variants thereof are not to be regarded as a departure from the spirit and scope of the invention.

What is claimed is:

1. A product comprising:
   a rotor lamination comprising:
   an annular portion which includes an annular opening in its center,
   a plurality magnets disposed in the annular portion;
   a linear first rotor lamination portion and a linear second rotor lamination portion disposed adjacent to the plurality of magnets, wherein the first rotor lamination portion is in direct contact with the at least one magnet and the second rotor lamination portion is not in direct contact with the at least one magnet, wherein the rotor lamination includes one of a bridge or a web, wherein the at least one magnet is not supported by the bridge or the web, wherein the first rotor lamination portion is comprised of a high mechanical strength electrical steel, wherein the second rotor lamination portion is comprised of a high electrical performance steel, wherein the second rotor lamination portion is free from centrifugal force coming from the at least one magnet.

2. A motor system comprising:
   at least one rotor core;
   at least one magnet disposed in the rotor core;
   a first rotor lamination portion and a second rotor lamination portion wherein the first rotor lamination portion is in contact with the at least one magnet and the second rotor lamination portion is not in contact with the at least one magnet, wherein the rotor lamination includes one of a bridge or a web, wherein the at least one magnet is not supported by the bridge or the web, wherein the first rotor lamination portion is comprised of a high mechanical strength electrical steel, wherein the second rotor lamination portion is comprised of a high electrical performance steel, wherein the second rotor lamination portion is free from centrifugal force coming from the at least one magnet.

* * * * *